United States Patent [19]

Pickard

[11] 4,130,204
[45] Dec. 19, 1978

[54] SIDE BOOM PIPE LAYING CRANE WITH PIPE SECTION ALIGNMENT FEATURE

[76] Inventor: Kenneth L. Pickard, 419 S. 106th East Ave., Tulsa, Okla. 74128

[21] Appl. No.: 828,294

[22] Filed: Aug. 26, 1977

[51] Int. Cl.² .............................................. B66C 23/42
[52] U.S. Cl. .................................. 214/1 PA; 214/87; 214/146.5; 214/147 AS
[58] Field of Search .................. 214/1 P, 1 PA, 86 R, 214/87, 77 R, 147 R, 147 AS, 147 G; 212/8 R, 8 B, 9

[56] References Cited

U.S. PATENT DOCUMENTS

| 3,515,296 | 6/1970 | Priefert | 214/77 R |
| 4,020,952 | 5/1977 | Scodino | 214/1 PA |

*Primary Examiner*—Robert G. Sheridan
*Attorney, Agent, or Firm*—Clarence A. O'Brien; Harvey B. Jacobson

[57] ABSTRACT

A mobile land vehicle is provided for laying successive pipe sections. The vehicle includes a frame having front and rear ends and ground engaging support means for the frame operative to support and advance the frame from and forwardly over the ground. The frame includes longitudinally spaced front and rear support structures supported therefrom and projecting outwardly from one side of the vehicle at points spaced therealong. The support structures each include pipe section engaging structures for engaging and supporting longitudinally spaced portions of a pipe section extending therebetween. The support structures each include structural components operative to adjustably vertically and laterally position the corresponding pipe section engaging structure relative to the frame of the vehicle.

11 Claims, 5 Drawing Figures

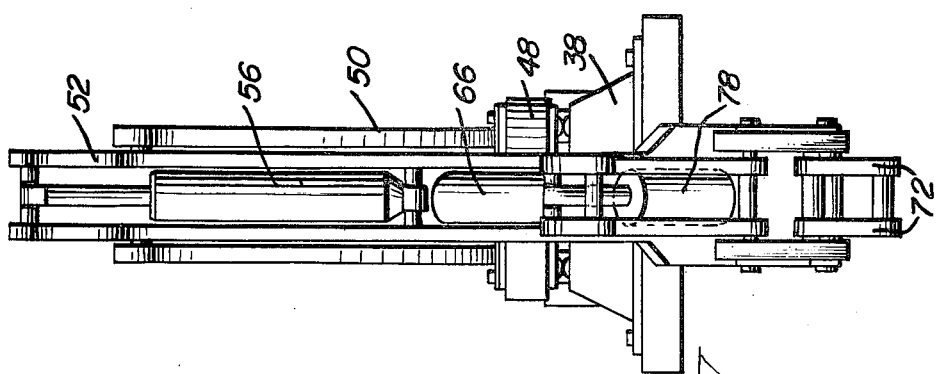
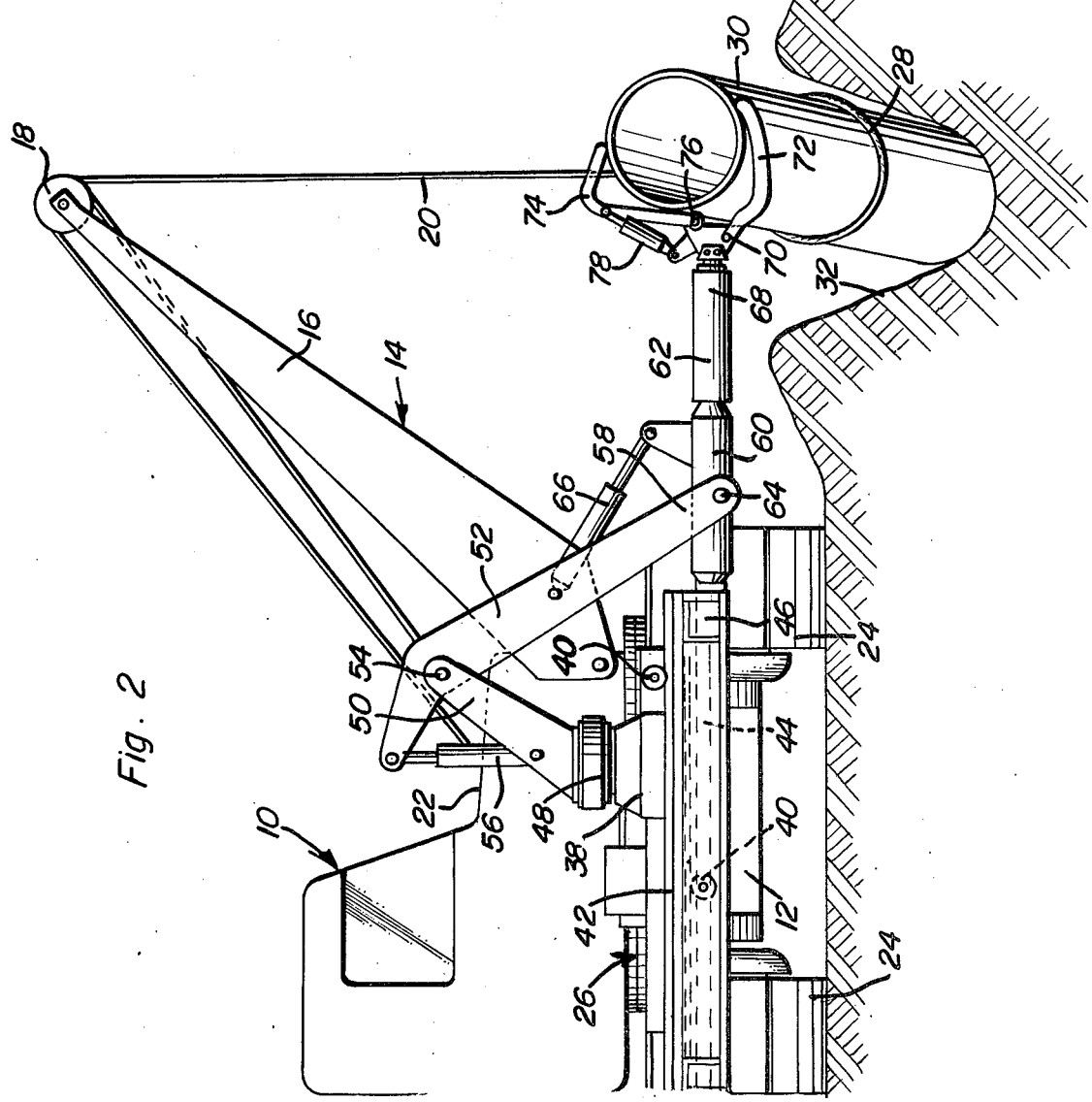

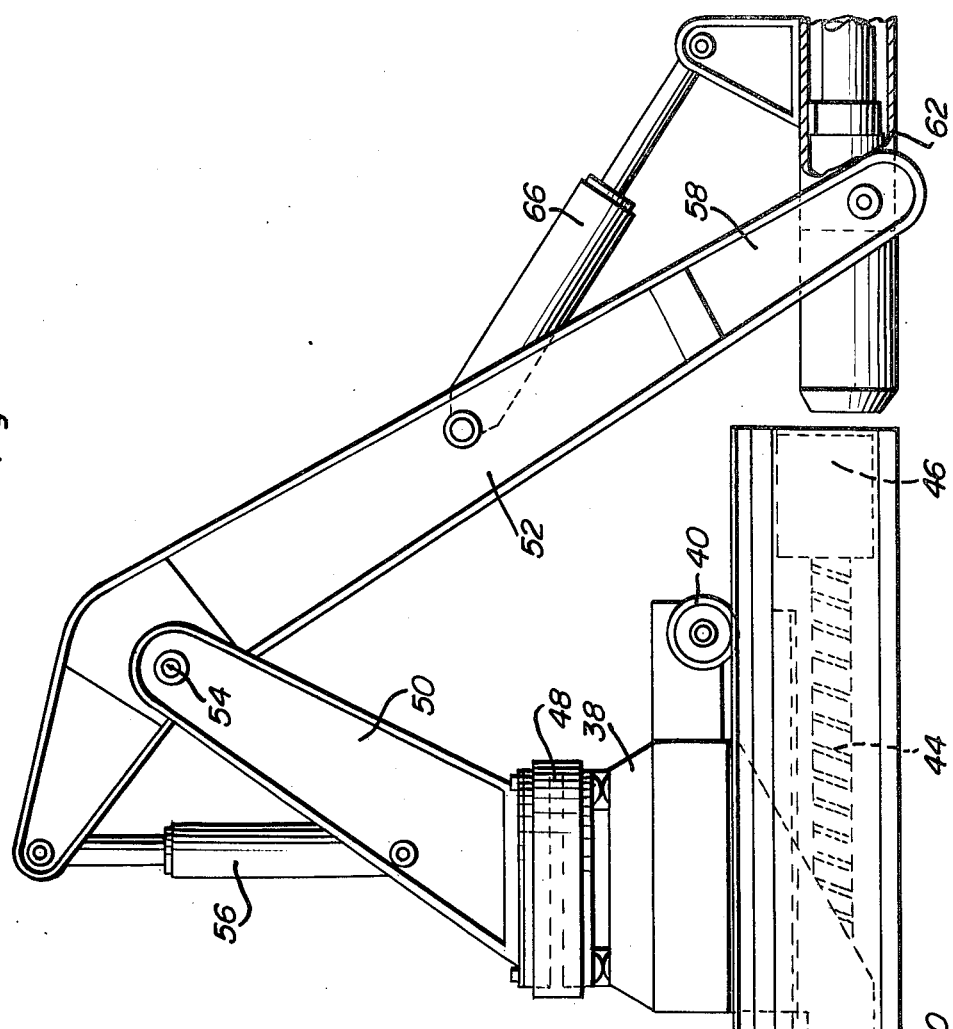
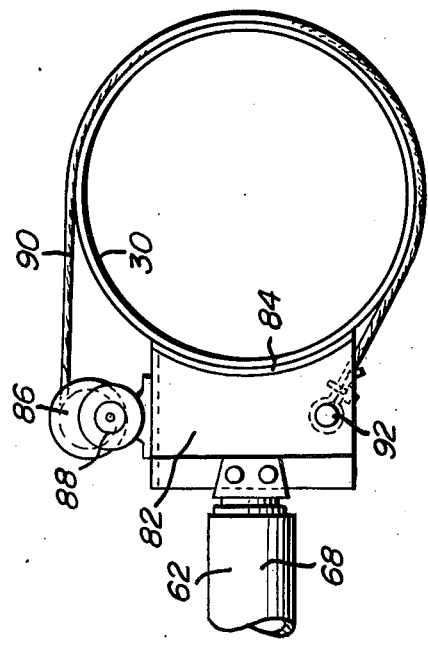

SIDE BOOM PIPE LAYING CRANE WITH PIPE SECTION ALIGNMENT FEATURE

BACKGROUND OF THE INVENTION

1. Field of the Invention

Various forms of vehicles have been heretofore provided for laying successive pipe sections. However, most vehicles which have been designed for laying successive pipe sections are operative only to engage and lower a pipe section into a trench for general alignment with the last laid pipe section and do not include features whereby the pipe section being laid may be precisely longitudinally aligned with the last laid pipe section in a manner enabling the adjacent ends of the last laid pipe section and the pipe section being laid to be readily welded together. As a result, the pipe laying operation of successive pipe sections usually requires at least two workmen adjacent the end of the pipe section being laid remote from the last laid pipe section for the purpose of manually shifting the adjacent end of the pipe section laterally, as may be necessary, to properly align and abut the adjacent ends of the last laid pipe section and the pipe section being laid in order that a proper weld between the abutted pipe section ends may be effected.

2. Description of the Prior Art

Examples of previously patented devices for laying pipe sections and other similar devices are disclosed in U.S. Pat. Nos. 1,877,974, 2,692,159, 2,737,140, 3,598,347, 3,711,920, and 3,970,295.

BRIEF DESCRIPTION OF THE INVENTION

The pipe section laying vehicle of the instant invention comprises a conventional crawler track equipped frame including a laterally outwardly projecting and adjustable boom having a suspension cable adjustably supported therefrom, whereby a pipe section to be laid may be supported adjacent its longitudinal mid-portion from the cable and lowered into the approximately correct position relative to the last laid pipe section for welding thereto. However, the vehicle further includes an adjustable boom structure carried by a forward portion thereof and from which the base end of an elongated support arm is pivotally supported for annular displacement about an axis extending longitudinally of the vehicle. The free end of the support arm includes pipe section engaging and support structure and the support arm is longitudinally extendible and retractable whereby the forward end portion of the pipe section being laid may be readily horizontally laterally shifted when the support arm is in a horizontal position. In this manner, the operator personnel of the vehicle may receive positioning instructions from a welder adjacent the abutted ends of the pipe section being laid and the last laid pipe section and properly laterally shift the remote end of the pipe section being laid in order that the aforementioned abutted ends will be fully aligned in readiness to be welded together.

The main object of this invention is to provide a pipe laying vehicle which will be capable of properly orienting a pipe section being laid relative to the last laid pipe section in order that the adjacent ends of the pipe sections may be readily welded together.

Another object of this invention is to provide an accessory for a conventional pipe laying land vehicle whereby the latter may be modified in accordance with the present invention.

Still another object of this invention is to provide an apparatus in accordance with the preceding objects and which will be capable of handling pipe sections of different sizes.

A further object of this invention is to provide a pipe laying vehicle which will be capable of handling pipe sections of different lengths.

A final object of this invention to be specifically enumerated herein is to provide a pipe laying vehicle in accordance with the preceding objects and which will conform to conventional forms of manufacture, be of simple construction and easy to operate so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 2 is a front elevational view of the assemblage illustrated in FIG. 1 and with the pipe laying machine shown in operation properly positioning a pipe section to be welded to the last laid pipe section;

FIG. 3 is a side elevational view of the forward pipe section and positioning boom of the pipe laying vehicle;

FIG. 4 is an enlarged fragmentary front elevational view of the structure illustrated in FIG. 3; and, FIG. 5 is a fragmentary front elevational view of a modified form of pipe section engaging and supporting structure which may be utilized on the free end portion of the boom assembly illustrated in FIG. 3.

DETAILED DESCRIPTION OF THE INVENTION

Figure 1:
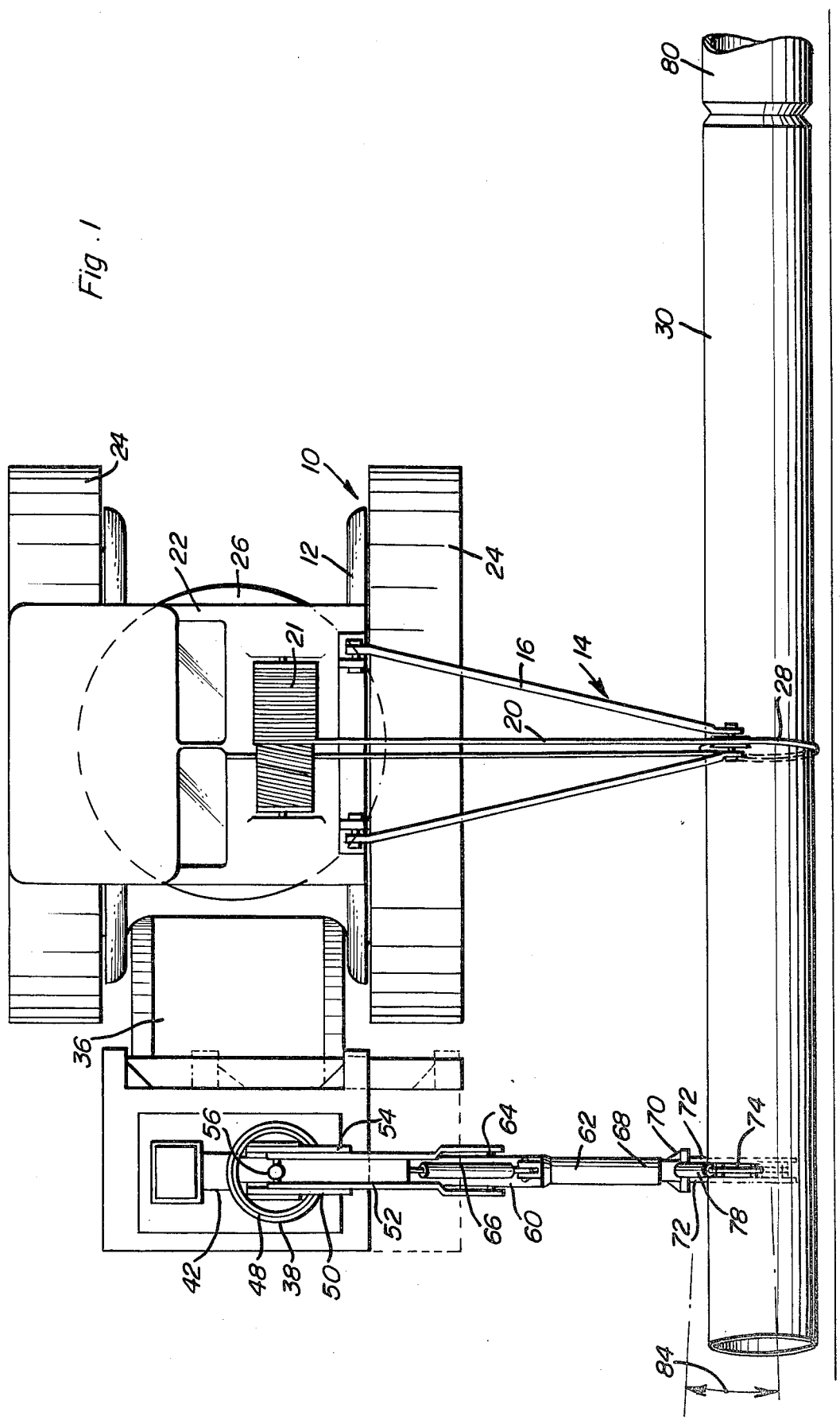
FIG. 1 is a top plan view of a pipe laying vehicle constructed in accordance with the present invention.

Referring now more specifically to the drawings, the numeral 10 generally designates a side boom pipe laying vehicle of conventional design. The vehicle 10 includes a frame 12 from which a side boom structure referred to in general by the reference numeral 14 is supported. The side boom structure 14 includes a boom member 16 which is swingable in a vertical plane and has a pulley structure 18 mounted on its free end over which the free end of a lifting cable 20 is trained. The other end of the lifting cable 20 is wound on a winch drum 21 carried by the cab structure 22 of the vehicle 10. The vehicle 10 includes endless track assemblies 24 supported from the frame 12 and the track assemblies 24 are driven by a prime mover (not shown). Further, the cab structure 22 is supported from the frame 12 by means of a turntable assembly referred to in general by the reference numeral 26.

The aforementioned description of the vehicle 10 is to be understood as conventional construction wherein a cable loop 28 may be supported from the free end of the cable 20 and engaged about the longitudinal midportion of a pipe section 30 being laid in order that the vehicle 10 may support the pipe section 30 and lower the latter into a trench or ditch 32 in which a pipe line is being laid.

The vehicle 10, however, includes a forward fixed mount 36 from which a base 38 is supported for transverse shifting relative to the vehicle frame 12. The base 38 includes follower wheels 40 rollingly engaged with a guide structure 42 defined by the mount 36 and a screw shaft 44 is journaled from the mount 36 and threadedly engaged with the base 38 in order to effect traversing of the base 38 back and forth transversely of the frame 12, the screw shaft 44 being selectively driven by means of a fluid motor 46.

The base 38 includes a turntable 48 from which a boom structure base 50 is supported. A boom 52 is oscillatably supported from the base 50 as at 54 and extendible double acting fluid motor 56 is operatively connected between the base 50 and the boom 52 for oscillating the latter relative to the base 50. The free end 58 of the boom 52 projects outwardly from the same side of the vehicle 10 from which the boom member 16 extends and has one base end portion 60 of a hydraulically longitudinally extendible and retractable support arm 62 oscillatably supported therefrom as at 64. A longitudinally extendible and retractable double acting fluid motor 66 is operatively connected between the boom 52 and the support arm 62 for selectively oscillating the support arm 62 relative to the boom 52. The outer extendible and retractable end 68 of the support arm 62 includes a mount 70 from which a pair of side-by-side laterally spaced fixed lower jaws 72 are supported. In addition, an upper jaw 74 is pivotally supported from the mount 70 as at 76 and an extendible and retractable double acting fluid cylinder 78 is operatively connected between the mount 70 and the jaw 74 for swinging the latter toward and away from the jaws 72. The jaw 74 is swingable in a plane extending between the jaws 72 and the jaws 72 and the jaw 74 may therefore enjoy a three point contact with the adjacent end of the pipe section 30.

In operation, the vehicle 10 is operated in the usual manner in order to engage the longitudinal midportion of the pipe section 30 with the loop 28 and to support the pipe section 30 from the cable 20. Thereafter, the boom member 16 and the cable 20 may be adjusted in order to lower the pipe section 30 into the trench or ditch 32. Thereafter, the boom 52 and support arm 62 may be angularly adjusted and the support arm 62 may be longitudinally adjusted with the adjacent end of the pipe section 30 clamped between the jaws 72 and 74 in order to laterally horizontally shift the end of the pipe section 30 engaged by the jaws or jaws 72 and 74 to a position with the pipe section 30 aligned with the last laid pipe section 80, see FIG. 1, in order that a proper weld may then be formed between the pipe sections 30 and 80.

With attention now invited more specifically to FIG. 5 of the drawings, there may be seen a modified form of mount 82 which may be utilized in lieu of the mount 70 and mounted on the outer end 68 of the support arm 62. The mount 82 does not include jaws, such as jaws 72 and 74, but defines an outwardly opening saddle 84 for embracingly engaging the adjacent side of the pipe section 30 and a winding member 86 driven by means of a hydraulic motor 88 is mounted on the mount 82 and has one end of a cable 90 wound thereon. The other end of the cable 90 is releasably attached to the mount 82 as at 92 and may be encircled about that portion of the pipe section 30 remote from the saddle 84 in order that the cable 90 may be tightened about the pipe section 30 for maintaining the latter in tight seated engagement with the saddle 84 during angular adjustment of the boom 52 and the support arm 62 as well as longitudinal extension and retraction of the support arm 62.

Thus it may be seen that the vehicle 10 is capable of shifting the end of the pipe section 30 remote from the pipe section 80 along the horizontal path 84 illustrated in FIG. 1 in order that the end of the pipe section 30 abutted with the pipe section 80 may be properly aligned therewith for forming a weld between the pipe sections 30 and 80.

The various hydraulic motors and cylinders may be supplied hydraulic fluid under pressure from a central hydraulic pressure service (not shown) on the vehicle 10 through suitable selectively actuatable controls (not shown) and the base 38 may be fixed on the mount 36, if desired.

In the event the pipe sections are not to be initially positioned within the trench 32, the vehicle 10 may be used to successively position the pipe sections in proper position for butt welding with the pipeline being formed supported in elevated position extending along the adjacent side of the trench 32. Thereafter, the pipeline thus formed may be gradually lowered into the trench or allowed to remain in elevated position, if the pipeline is to remain exposed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A mobile land vehicle for laying successive pipe sections, said vehicle including a frame having front and rear ends and ground engageable support means for said frame adapted to support and advance said frame from and forwardly over the ground, said frame including longitudinally spaced front and rear support means supported from and projecting outwardly from one side of said vehicle at points spaced therealong, said support means each including pipe section engaging means adapted to engage and support longitudinally spaced portions of a pipe section extending therebetween, said support means each including means operative to selectively adjustably vertically and laterally position the corresponding pipe section engaging means relative to said frame, independent of vertical and/or lateral positioning of the other pipe section engaging means relative to said frame.

2. The combination of claim 1, wherein said rear support means includes a vertically swingable inclined boom having its lower end pivotally supported from said frame for oscillation about an axis extending longitudinally of said frame, the pipe section engaging means for said rear support means including lift cable means guidingly supported for longitudinal shifting relative to the upper end of said boom, said cable means including a portion thereof depending downwardly from said upper end of said boom and including a pipe section support structure for support of the corresponding portion of said pipe section therefrom.

3. The combination of claim 1, wherein said front support means includes a vertically swingable boom structure oscillatably supported at one end thereof from said frame for selective angular displacement about a second axis extending longitudinally of said frame, a support arm pivotally supported at one end from the other end of said boom structure for selective angular displacement about a third axis extending longitudinally of said frame, the pipe section engaging means for said front support means being carried by the other end of said support arm.

4. The combination of claim 3, wherein said support arm includes selectively extendible and retractable opposite end portions defining said one and other ends thereof.

5. The combination of claim 4, wherein said pipe section engaging means for said front support means includes coacting jaw members carried by said other end of said support arm shiftable relative to each other for clamping a pipe section therebetween.

6. The combination of claim 1, wherein said front support means includes a vertically swingable boom structure oscillatably supported at one end thereof from said frame for selective angular displacement about a second axis extending longitudinally of said frame, a support arm pivotally supported at one end from the other end of said boom structure for selective angular displacement about a third axis extending longitudinally of said frame, the pipe section engaging means for said front support means being carried by the other end of said support arm, said frame including a turntable rotatably supported therefrom for angular displacement about an upstanding axis, said one end of said boom structure being oscillatably supported from said turntable.

7. The combination of claim 6, including means for laterally shifting said upstanding axis relative to said frame transversely of the latter.

8. The combination of claim 7, wherein said rear support means includes a vertically swingable inclined boom having its lower end pivotally supported from said frame for oscillation about an axis extending longitudinally of said frame, the pipe section engaging means for said rear support means including lift cable means guidingly supported for longitudinal shifting relative to the upper end of said boom, said cable means including a portion thereof depending downwardly from said upper end of said boom and including pipe section support structure for support of the corresponding portion of said pipe section therefrom.

9. The combination of claim 8, wherein said support arm includes selectively extendible and retractable opposite end portions defining said one and other ends thereof.

10. The combination of claim 9, wherein said pipe section engaging means for said front support means includes coacting jaw members carried by said other end of said support arm shiftable relative to each other for clamping a pipe section therebetween.

11. The combination of claim 1, wherein said front support means includes a vertically swingable boom structure oscillatably supported at one end thereof from said frame for selective angular displacement about a second axis extending longitudinally of said frame, a support arm pivotally supported at one end from the other end of said boom structure for selective angular displacement about a third axis extending longitudinally of said frame, the pipe section engaging means for said front support means being carried by the other end of said support arm, said pipe section engaging means defining an outwardly opening saddle in which to embracingly receive an adjacent pipe section portion and adjustable length cable means operative to encircle the portions of said pipe section portion remote from said saddle for retaining said pipe section portion seatingly engaged in and embracingly engaged by said saddle.

* * * * *